United States Patent
Panosyan et al.

(10) Patent No.: US 10,050,433 B2
(45) Date of Patent: Aug. 14, 2018

(54) POWER GENERATION SYSTEM AND METHOD WITH RESISTIVE BRAKING CAPABILITY

(71) Applicant: General Electric Company, Schenectady, NY (US)

(72) Inventors: Ara Panosyan, Munich (DE); Christoph Boeld, Munich (DE); Herbert Schaumberger, Muenster (AT)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 553 days.

(21) Appl. No.: 14/566,749

(22) Filed: Dec. 11, 2014

(65) Prior Publication Data
US 2016/0172842 A1    Jun. 16, 2016

(51) Int. Cl.
*H02H 7/06* (2006.01)
*H02P 9/10* (2006.01)
(Continued)

(52) U.S. Cl.
CPC ............. *H02H 7/067* (2013.01); *H02J 3/381* (2013.01); *H02P 3/22* (2013.01); *H02P 9/006* (2013.01);
(Continued)

(58) Field of Classification Search
CPC . H02H 7/067; H02P 9/102; H02P 9/00; F03D 9/003; H02J 1/10; B60L 7/04
(Continued)

(56) References Cited

U.S. PATENT DOCUMENTS 5,323,095 A * 6/1994 Kumar .................. B60L 7/04
                                                  318/152
7,102,247 B2   9/2006 Feddersen
(Continued)

FOREIGN PATENT DOCUMENTS

CN    102709942 A    10/2012
EP      2869426 A1    5/2015
(Continued)

OTHER PUBLICATIONS

Causebrook et al., "Fault Ride-Through: Shifting the Balance of Power From Blade Pitch to Electrical Resistance", University of Newcastle—upon-Tyne, United Kingdom, pp. 1-7, 2006.
(Continued)

*Primary Examiner* — Jared Fureman
*Assistant Examiner* — Win Htun
(74) *Attorney, Agent, or Firm* — GE Global Patent Operation; John Darling

(57) ABSTRACT

A power generation system includes a generator operatively coupled to an engine for generating electrical power and supplying the electrical power to a grid. Further, the power generation system includes a resistive braking system operatively coupled between the generator and the grid. The resistive braking system includes a mechanical switch connected in parallel with a resistor, and a controller for, in response to a grid event, controlling power from the engine and operating the mechanical switch to redirect current between the mechanical switch and the parallel connected resistor.

9 Claims, 4 Drawing Sheets

(51) Int. Cl.
*H02P 9/04* (2006.01)
*H02P 9/00* (2006.01)
*H02J 3/38* (2006.01)
*H02P 3/22* (2006.01)
*H02H 9/02* (2006.01)

(52) U.S. Cl.
CPC ................ *H02P 9/04* (2013.01); *H02P 9/102* (2013.01); *H02H 9/026* (2013.01)

(58) Field of Classification Search
USPC .................. 290/40, 41, 44; 361/20; 322/17; 318/152; 307/103
See application file for complete search history.

(56) References Cited

U.S. PATENT DOCUMENTS

| | | | |
|---|---|---|---|
| 7,622,815 B2 | 11/2009 | Rivas et al. | |
| 8,207,623 B2* | 6/2012 | Rivas | F03D 7/0224 290/44 |
| 8,405,237 B2* | 3/2013 | Warfen | F03D 7/0224 290/44 |
| 8,471,534 B2 | 6/2013 | Panosyan et al. | |
| 8,692,523 B2 | 4/2014 | Drobnjak et al. | |
| 2002/0190695 A1* | 12/2002 | Wall | H02J 1/10 322/17 |
| 2006/0267560 A1 | 11/2006 | Rajda et al. | |
| 2007/0177314 A1* | 8/2007 | Weng | F03D 9/003 361/20 |
| 2007/0279815 A1* | 12/2007 | Li | F03D 7/0248 361/54 |
| 2009/0250943 A1* | 10/2009 | Larsen | H02P 9/102 290/40 B |
| 2010/0025995 A1* | 2/2010 | Lang | H02M 5/4505 290/44 |
| 2011/0163546 A1* | 7/2011 | Gupta | F03D 7/0272 290/44 |
| 2012/0175876 A1* | 7/2012 | Pendray | F02D 19/02 290/41 |
| 2014/0001756 A1 | 1/2014 | Panosyan et al. | |
| 2015/0077067 A1* | 3/2015 | Kanjiya | H02H 7/067 322/21 |
| 2015/0188468 A1* | 7/2015 | Xu | H02P 9/007 290/44 |
| 2015/0357950 A1* | 12/2015 | Lyons | H02P 9/102 290/40 B |

FOREIGN PATENT DOCUMENTS

| | | |
|---|---|---|
| WO | 2007072007 A1 | 6/2007 |
| WO | 2010134994 A1 | 11/2010 |
| WO | 2011019321 A2 | 2/2011 |
| WO | 2014008647 A1 | 1/2014 |

OTHER PUBLICATIONS

Enyuan et al., "Experimental Study of High-Speed Hybrid Circuit Breaker Used in Fast Isolation of Faulty Power", Electric Power Equipment—Switching Technology (ICEPE-ST), 2013 2nd International Conference on, Abstract—2 Pages, Oct. 20-23, 2013, Matsue-city, Japan.

European Search Report issued in connection with corresponding European Application No. EP15197002.7 dated May 3, 2016.

* cited by examiner

POWER GENERATION SYSTEM AND METHOD WITH RESISTIVE BRAKING CAPABILITY

BACKGROUND

This invention relates generally to electric energy conversion, and, more specifically, to a system and a method for resistive braking capability of small generator sets with low moments of inertia connected to an electric grid.

Distributed energy resource (DER) systems are small power generators, typically in a range from 3 kW to 10000 kW, that generate power from various sources and transfer the generated power to a grid connected to the power generators. The grid may be a power grid or an island grid. Further, the grid collects the power generated from multiple power generators and transmits the power to different locations or to one or more customer loads. Typically, the DER systems are an alternative to or an enhancement of traditional electric power systems. Small power generators may be powered by small gas turbines or may include fuel cells and/or wind powered generators, for example. The DER systems reduce the amount of energy lost in transmitting electricity because the electricity is generated very close to where it is used, perhaps even in the same building. DER systems also reduce the size and number of power lines that must be constructed. However, due to increased use of distributed power generation, many grid codes are requiring small generator sets to provide enhanced capabilities such as fault voltage ride through.

When a fault in the electric power system occurs, voltage in the system could drop by a significant amount for a short time duration (typically less than 500 milliseconds) until the fault is cleared. Faults such as a phase conductor being connected to ground (a ground fault) or a short circuiting of phase conductors may occur during lightning and wind storms or due to a transmission line being connected to the ground by accident. In the past, under inadvertent fault and large power disturbance circumstances, it has been acceptable and desirable for small generator sets to trip off line whenever the voltage drop occurs. Operating in this way has no real detrimental effect on the supply of electricity when penetration level of small power generator sets is low. However, as penetration of small generator sets in the electric power system increases, it is desirable for these small generator sets to remain on line and ride through such a low voltage condition, to stay synchronized with the electric grid, and to be able to continue supplying power to the grid after the fault is cleared. This is similar to the requirements applied to large power generator sets.

Therefore, it is desirable to determine a method and a system that will address the foregoing issues.

BRIEF DESCRIPTION

In accordance with an embodiment of the present invention, a power generation system is provided. The power generation system includes a generator operatively coupled to an engine for generating electrical power and supplying the electrical power to a grid. Further, the power generation system includes a resistive braking system operatively coupled between the generator and the grid. The resistive braking system includes a mechanical switch connected in parallel with a resistor, and a controller for, in response to a grid event, controlling power from the engine and operating the mechanical switch to redirect current between the mechanical switch and the parallel connected resistor.

In accordance with a further aspect of the present disclosure, a method of supplying electrical power to a grid from a generator coupled to a resistive braking system connected between the generator and the grid. The resistive braking system includes a mechanical switch connected in parallel with a resistor. The method includes supplying the electrical power to the grid through the mechanical switch under normal operating conditions. Further, the method includes upon a grid event being detected, (a) controlling power to the generator, and (b) operating the mechanical switch so that current from the generator is redirected between the mechanical switch and the resistor.

DRAWINGS

These and other features, aspects, and advantages of the present invention will become better understood when the following detailed description is read with reference to the accompanying drawings in which like characters represent like parts throughout the drawings, wherein.

Figure 4:
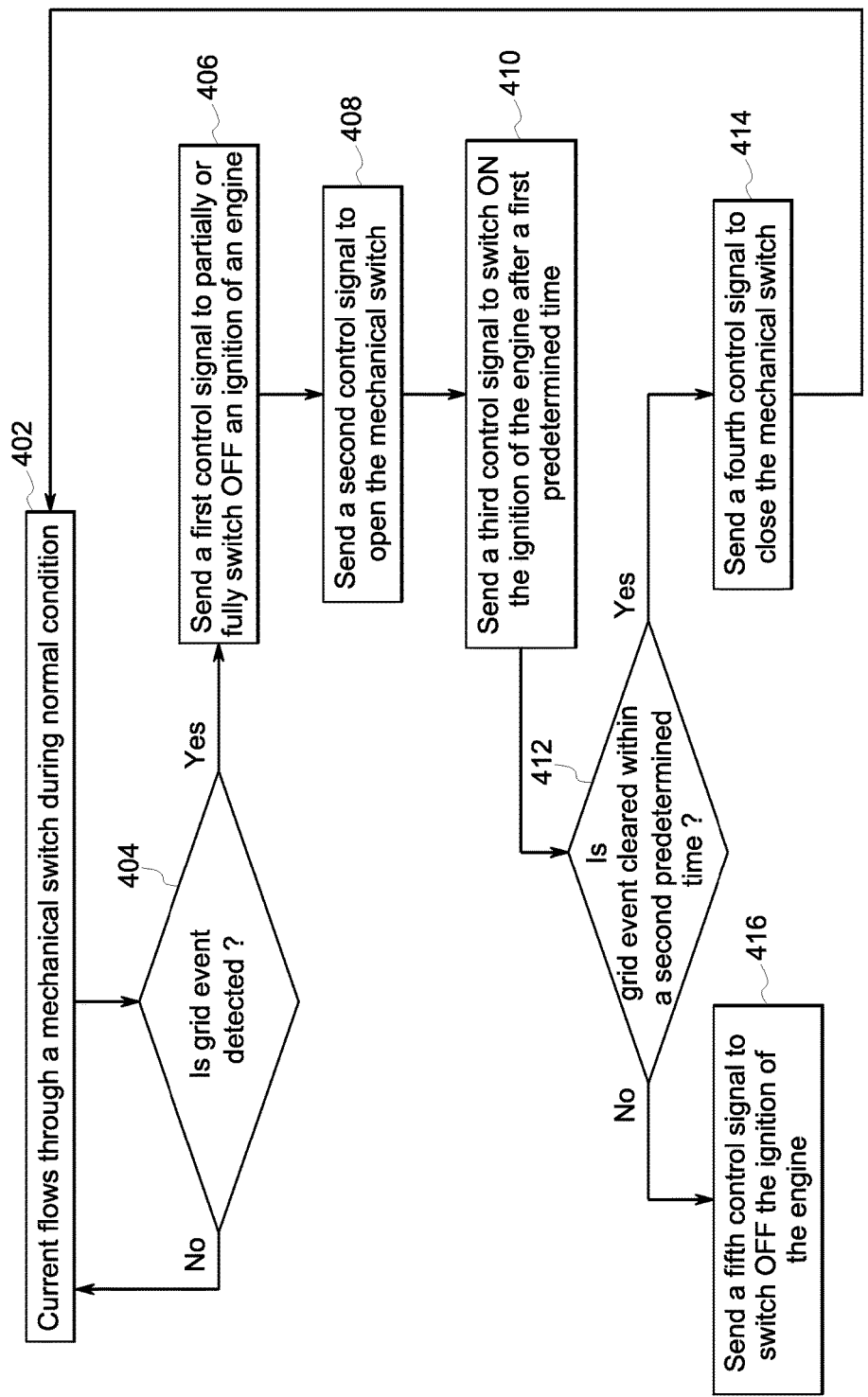

FIGS. 3(a)-3(g) are diagrammatical representations of various stages of resistive braking operation according to aspects of the present disclosure; and FIG. 4 is a flow chart illustrating a method for supplying power from a generator to a grid, in accordance with aspects of the present disclosure.

DETAILED DESCRIPTION

As discussed in detail below, embodiments of the present invention function to provide a system and a method for resistive braking capability of small power generator sets with low moments of inertia connected to a grid.

Figure 1:
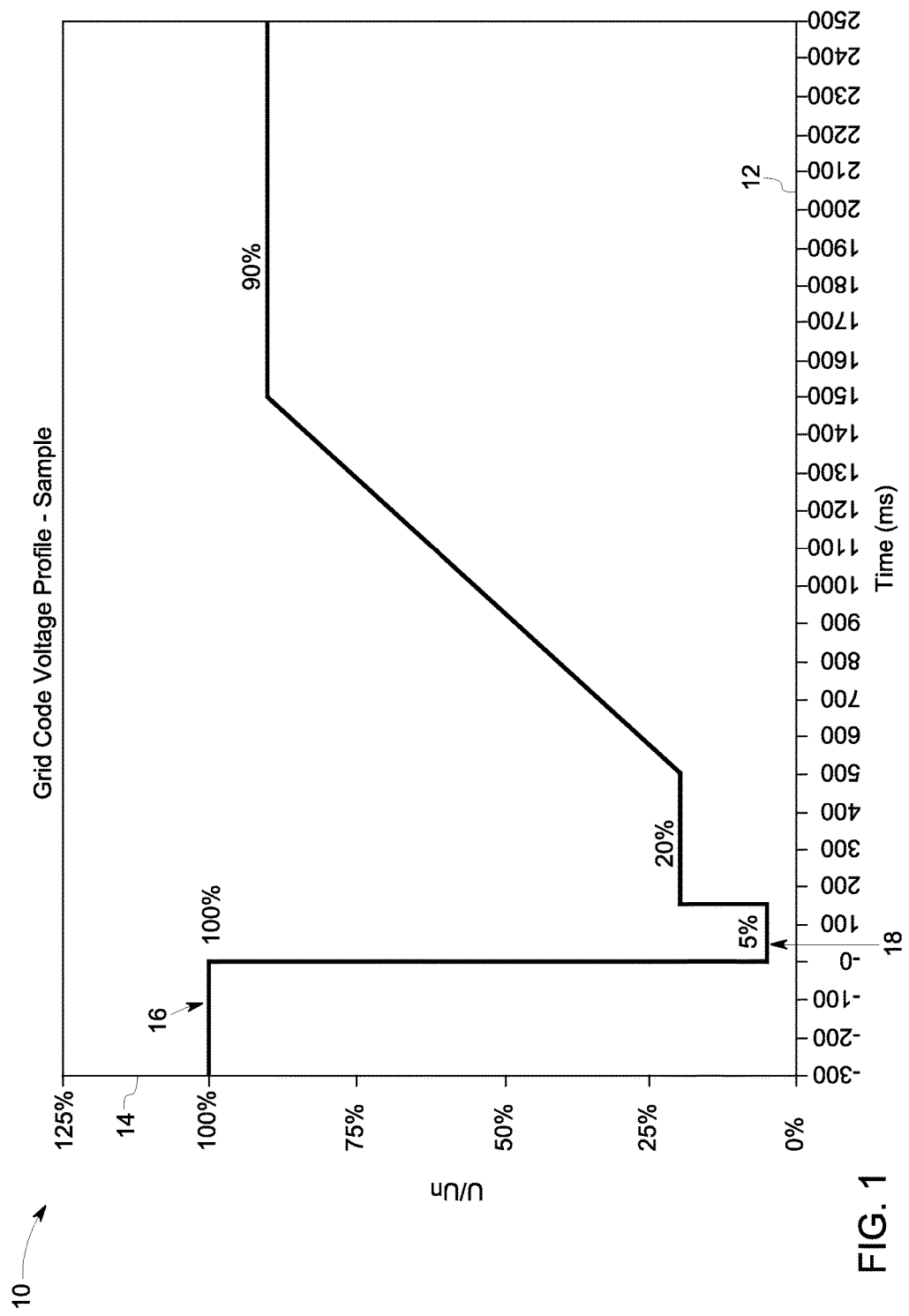
FIG. 1 is a plot of a grid code defined voltage profile before, during and after a fault.

FIG. 1 illustrates a plot 10 of an example of a grid code voltage profile at the point of connection (POC) of a generator to the grid. Some of the grid authorities expect that the generators should not be disconnected from the grid if the voltage at the POC is higher than the voltage profile shown. However, this is one exemplary case, and the voltage profile requirement may vary from country to country or from grid authority to grid authority. The plot 10 shows a horizontal axis 12 representing time in milliseconds and a vertical axis 14 representing voltage in percentage of the nominal voltage. The fault occurs at 0 milliseconds. Before the fault, the system is in stable condition, so the pre-fault voltage 16 at the POC i.e. before 0 milliseconds is 100% or 1 per unit. Due to a fault in the grid, the voltage 18 at 0 milliseconds drops down to as low as 5% at the beginning of the fault. It should be noted that the voltage drop at the POC depends on the distance of fault to the POC, the fault impedance, the type of fault, the grid characteristics and so forth. In one embodiment, the voltage may be lower than 5%, or in another embodiment; the voltage may be greater than 5%.

When the voltage falls to 5% of the nominal voltage, it is likely that the generator is not able to export full power to the grid during the low voltage condition. If at the same time the prime mover continues to deliver constant mechanical power to the generator, this will result in acceleration of the engine-generator rotating masses, and the rotor speed will increase. The increase of the rotor speed will result in excessive increase of the synchronous generator rotor angle, which may lead to a loss of synchronism. In such circumstances, the generator will trip and not fulfill the grid code requirement. This could be avoided by reducing the rotor speed to or below a synchronous speed and therewith stopping the rotor angle to increase before synchronism is lost and bringing the power generation system back to a stable operating point. The reduction in rotor speed requires decelerating the rotating masses on time. In the example of the grid code voltage profile, the fault event duration is shown as 150 ms.

Figure 2:
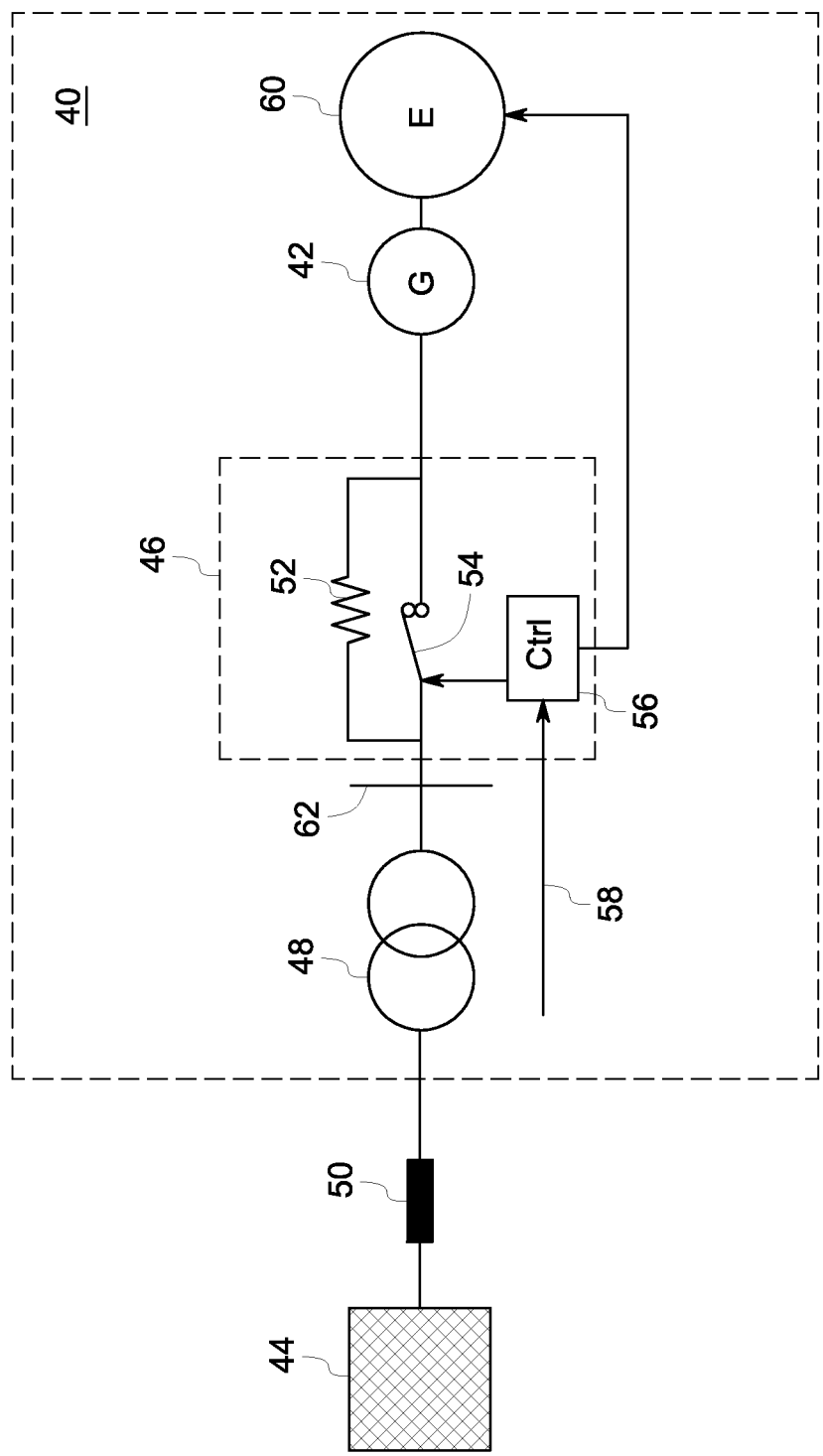
FIG. 2 is a diagrammatical representation of a power generation system connected to an electric grid and utilizing a resistive braking system according to aspects of the present disclosure.
Figure 3A:
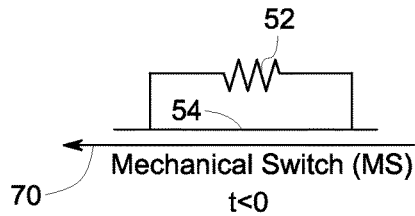
Figure 3B:
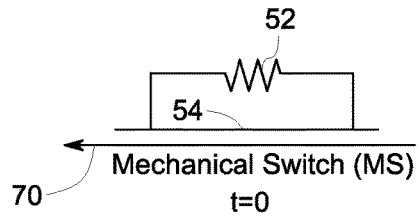
Figure 3C:
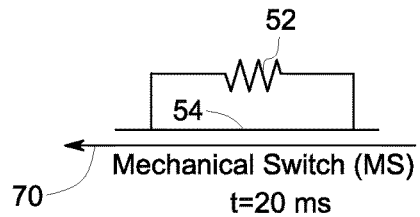
Figure 3D:
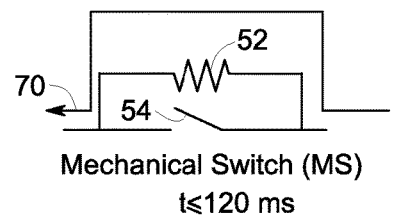
Figure 3E:
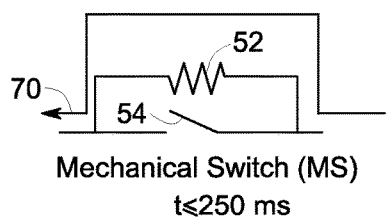
Figure 3F:
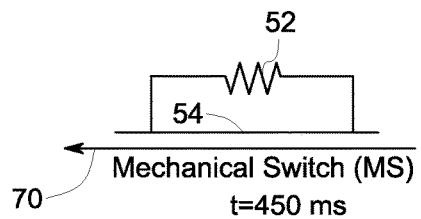
Figure 3G:
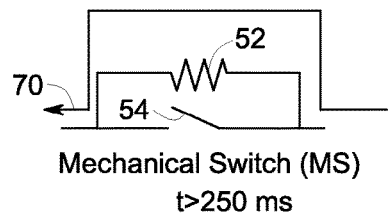

FIG. 2 shows a power generation system 40 connected to a grid 44 utilizing a resistive braking system 46 in accordance with an embodiment of the present invention. The power generation system 40 includes a prime mover 60 and a generator 42 which is connected to the grid 44. In one embodiment, the generator 42 may have a small power rating such as, for example, less than 10 MW. Further, the generator 42 is mechanically coupled to the prime mover 60, which in one embodiment comprises an engine. It may be noted that the terms "prime mover" and "engine" may be used interchangeably in the following description. In one embodiment, the engine 60 may include a gas turbine, a gas engine, or a wind turbine. In some embodiments, the generator 42 may be coupled to the grid 44 through a power electronic converter (not shown), and, in other embodiments, the generator 42 may be coupled to the grid 44 without any power electronic converter. It may be noted that the grid 44 may be a power grid that transmits power to a different location or an island grid that supports one or more customer loads.

In the embodiment of FIG. 2, the generator 42 is connected to the grid 44 via the resistive braking system 46, a transformer 48, and a transmission line 50. It should be noted that the arrangement shown in FIG. 2 is one exemplary configuration and that other configurations may be used. For example, the resistive braking system 46 may be connected between the transformer 48 and the grid 44. Additionally, it should be noted that the FIG. 2 shows a single line diagram of the grid 44 for ease of illustration.

As depicted in FIG. 2, the resistive braking system 46 is connected in series with the generator 42 and comprises a resistor 52, a mechanical switch 54, and a controller 56. The resistor 52 and the mechanical switch 54 are connected in parallel with each other. The resistor 52 may be used to absorb the electrical power from the generator 42 during a grid event. In one example, the grid event may include a low voltage condition in the grid 44. During the grid event or immediately after the grid event, the mechanical power input to the generator 42 will be larger than the electrical power output to the grid 44 and thus, the resistor 52 is used to absorb the electrical power from the generator 42 to prevent acceleration of the generator 42. The controller 56 receives an input signal 58 and provides one or more control signals to the mechanical switch 54 and the engine 60. In one example, the controller 56 sends a control signal to an ignition (not shown) of the engine 60 to control the speed of the engine 60. The speed of the engine 60 may be controlled for adjusting the mechanical power provided to the generator 42.

In one embodiment, the input signal 58 includes a voltage signal, a current signal, a generator power signal, a speed signal, a rotor angle signal, an engine power signal, an engine torque signal, or any combinations thereof. In one voltage signal example, the voltage signal may indicate a fault voltage at a point of connection (POC) 62 or the grid 44. As another example, the current signal may indicate the electrical current at the generator 42. In still another example, the generator power signal may indicate the electrical power produced by the generator 42. The rotor angle signal may indicate, for example, an electrical angle between the stator voltage of the generator 42 and the voltage in the grid 44. The speed signal may indicate speed of a rotatable shaft coupled between the generator 42 and the engine 60. Finally, the engine power signal and the engine torque signal may respectively indicate the mechanical power and the torque at the engine 60. The controller 56 uses the input signal 58 to determine whether a grid event has occurred in the system or not and provides control signals to control the operation of the engine 60 and mechanical switch 54 in the event of the-grid event.

In operation, during normal conditions, the mechanical switch 54 is closed and is in a conducting or ON state. When conducting, the mechanical switch 54 has negligible on-resistance as compared to the resistor 52, and thus the electrical current from the generator 42 is directed through the mechanical switch 54.

If a grid event occurs at the grid 44, the voltage at the POC 62 of the generator 42 drops significantly. The grid event may include a low voltage condition in the system 40. In one example, if the low voltage condition at the POC 62 continues for a threshold time, the generator 42 may be subjected to extremely high currents due to the large angle between a generator rotor and the grid 44. The generator 42 should therefore be disconnected from the grid 44 to protect itself from these high currents. The growing angle between the generator rotor and the grid 44 could also lead to loss of synchronism between the generator 42 and the grid 44, which will also require disconnecting the generator 42 from the grid 44. However, to fulfill the grid code fault ride through requirements, the generator 42 should be able to stay connected to the grid 44 and continue supplying power to the grid 44 after the grid event is cleared and the voltage at the POC 62 recovers to pre grid event levels. In other words, during a grid event condition, the generator speed and the rotor angle should stay within acceptable limits, as long as the voltage at the POC 62 is above the voltage profile given by the grid code.

In one embodiment of the present invention, when voltage drops at the POC 62 due to the grid event in the grid 44, the controller 56 detects the grid event and triggers the engine 60 that is connected to the generator 42 to control the power that is delivered to the generator and thus the speed of the generator. In one example, the controller 56 may send a first control signal to the ignition of the engine 60 to partially or fully switch OFF the ignition of the engine 60. This in turn may reduce or stop the generator 42 from accelerating, due to the limited electric power that the generator 42 can supply to the grid 44 during low voltage conditions at the POC 62.

In addition, the controller 56 may send a second control signal to the mechanical switch 54 to open or turn OFF the mechanical switch 54. In one embodiment, the controller 56 may concurrently send the first and second control signals. Even when the first and second control signals are sent concurrently, there will be some inherent delay in opening the mechanical switch due to the braking time needed for switch opening. In one example, the braking time may be in a range from about 50 ms to about 100 ms.

In one embodiment, the mechanical switch 54 may open or turn OFF before a first predetermined time from the detection of grid event. In one example wherein the mechanical switch takes about 100 ms to open, if the grid event is detected at 20 ms from the occurrence of the grid event, the mechanical switch may be triggered at that same time such that the mechanical switch 54 may completely open or turn OFF by 120 ms from the occurrence of the grid event. During this time period, the electrical current may continue to flow to the grid 44 via the mechanical switch 54 and the generator 42 may lose synchronism with the grid 44. To overcome this problem, when the grid event is detected, the controller 56 may also send the first control signal to more quickly partially or fully switch OFF the ignition of the engine 60. When the ignition of the engine 60 is partially or fully switched OFF, the mechanical power provided to the generator 42 is reduced or controlled. This in turn regulates the generator speed and the rotor angle within acceptable limits during this time period. Also, synchronism may be maintained between the generator 42 and the grid 44.

When the mechanical switch 54 is operated to be open, the current from the generator 42 is redirected to the resistor 52 and electrical power may be dissipated as heat across the resistor 52. The active power consumed by the resistor 52 during the grid event condition depends on the voltage across the resistor 52 and is generally given by $Vr^2/R$, where Vr is the root mean square (RMS) voltage across the resistor 52 and R is the resistance value of the resistor 52. Thus, if the Vr is 0.3 pu and R is 0.1 pu, then the power consumed by the resistor 52 would be 0.9 pu which is almost equivalent to the total power supplied by the generator 42. In other words, in this case, the resistor 52 could consume up to 90% of the power supplied by the engine 60 to the generator 42 and hence considerably reduce the generator acceleration during the low voltage condition. Thus, the generator 42 is able to keep its rotational speed or rotor angle in an acceptable range and does not need to be disconnected from the grid 44 during or after the grid event.

In a further example embodiment, after the first predetermined time (120 ms), the controller 56 may send a third control signal to the ignition of the engine 60 to partially or fully switch ON the engine 60. This is particularly useful when the engine ignition cannot be fully switched OFF for a longer duration (e.g., one or more engine cycles). Particularly, if the engine 60 is not switched ON within a determined time period, non-combusted gas may accumulate in the exhaust side of the engine 60. This in turn may lead to combustion in the exhaust itself and may damage the engine 60. Thus, to overcome this problem, the engine 60 is partially or fully switched ON after the first predetermined time.

If controller 56 determines that the grid event is cleared within a second predetermined time such as, for example, 250 ms from the grid event, and the voltage at the POC is back to an acceptable level at which the generator 42 can supply power to the grid 44, the mechanical switch 54 is triggered to be switched ON. Particularly, the controller 56 may send a fourth signal to the mechanical switch 54 to close or switch ON the mechanical switch 54. In a similar manner as there is an inherent physical delay in opening a mechanical switch, the mechanical switch 54 will require some time to close. In one example, the mechanical switch may close by 450 ms from the grid event condition. Once the mechanical switch 54 is switched ON completely, the electrical current from the generator 42 may flow through the mechanical switch 54 and thus, normal operation or pre grid event condition is restored.

However, if the grid event is not cleared within the second predetermined time (250 ms) and the generator 42 comes to a standstill, then the generator 42 would need to be disconnected from the grid 44 to avoid being subjected to extremely high currents due to the large angle between a generator rotor and the grid 44. In this embodiment, the controller 56 may send a fifth control signal to disconnect the generator 42. In one example, the second predetermine time may be in a range from about 220 ms to 280 ms from the occurrence of the grid event. In other examples, the second predetermined time may be decided by an operator based on grid code requirements and is generally a required maximum duration for fault voltage ride through. In other words, if the grid event is not cleared within the second predetermined time, then engine 60 is switched OFF eventually resulting in no power supplied by the generator 42 to the grid 44.

FIGS. 3(*a*)-3(*e*) show various stages of resistive braking operation according to one example of the present disclosure, and FIG. 4 is a related flow chart. All time periods are for purposes of example only. FIG. 3(*a*) shows a normal condition or no grid event condition (t<0) where the mechanical switch 54 is conducting and the resistor 52 is not conducting as represented by step 402 in FIG. 4. When the mechanical switch 54 is described herein as "conducting" and the resistor 52 as "not conducting", it is meant that the current flow is primarily through the mechanical switch 54, and is not meant to exclude the possibility of some small amount of current passing through the resistor 52. During this stage, a generator current 70 flows through mechanical switch 54 and not through the resistor 52. At t=0 (FIG. 3(*b*)), a grid event occurs in the grid, and at t=20 ms (FIG. 3(*c*)), the grid event is detected by the resistive braking system 46 as represented by step 404 in FIG. 4. In one embodiment, the grid event may be detected based on the voltage signal, the current signal, the speed signal, the power signal, the torque signal, the rotor angle signal, or any combinations thereof. As can be seen in FIG. 3(*b*) and FIG. 3(*c*), during these stages, generator current 70 still flows through the mechanical switch 54 because control actions have not been initiated. It should be noted that the timings shown here (i.e., t=0, 20, 120, 250 ms etc.) are only for illustrative purposes and in other embodiments, the timings may be based on system and control parameters.

Furthermore, at t=20 ms when the grid event is detected by the resistive braking system, a first control signal is sent to the generator engine so as to partially or fully switch OFF its ignition as represented by step 406 in FIG. 4. Simultaneously or shortly thereafter, a second control signal is sent to the mechanical switch 54 to open it as represented by step 408 in FIG. 4. However, the mechanical switch 54 may take a certain time to completely open. During this time period, generator current 70 may continue to flow through the mechanical switch 54.

Further, at or before a first predetermined e.g., t<120 ms, the mechanical switch is opened or switched OFF, and, as a result, the generator current 70 flows only through the resistor 52 and not through the mechanical switch 54, as depicted in FIG. 3(*d*). At this stage, the resistor 52 is used to absorb the electrical power from the generator 42. In addition, after the first predetermined time, a third control signal is sent to switch ON the ignition of the engine 60, as represented by step 410 in FIG. 4. In one example, the engine ignition is switched ON back to the pre grid event power level. This is generally done in the embodiment where the engine ignition cannot to be switched OFF for a longer duration (e.g., one or more engine cycles).

Thereafter, the controller 56 verifies whether the grid event has been cleared within a second predetermined time as represented by step 412 in FIG. 4. If the grid event is cleared within the second predetermined time, e.g. at t<250 ms (FIG. 3(*e*)), the mechanical switch 54 is triggered to close or switch ON as represented by step 414 in FIG. 4. In one embodiment, along with the grid event clearance, the voltage at the POC may be verified to confirm that the voltage is back to acceptable level at which the generator 42 can supply power to the grid 44.

After triggering the mechanical switch 54, the mechanical switch 54 may take a certain time, e.g., t=450 ms to completely close. During this time period, generator current 70 may continue to flow through the resistor 52, as shown in FIG. 3 (*e*). Further, once the mechanical switch 54 is completely closed e.g., t=450 ms, the resistive braking system 46 is brought back to its initial state during normal conditions before the grid event. At this stage, the generator current may flow through the mechanical switch 54, as depicted in FIG. 3 (*f*).

Furthermore, if the grid event is not cleared after the second predetermined time, e.g. at t>250 ms (FIG. 3(*g*)), and the voltage at the POC is below the voltage profile given by the grid code then the engine ignition is triggered to be fully switched OFF as represented by step 416 in FIG. 4, resulting in both mechanical switch 54 and the engine ignition in the OFF state. The generator 42 is thus quickly disconnected from the grid 44, eventually resulting in no power supplied by the generator 42 to the grid 44.

One of the advantages of the embodiments disclosed herein is to achieve faster and longer resistive braking. Particularly, if the system includes only the mechanical switch with the parallel resistor (without an engine control), the amount and the duration of braking power is defined by the electrical and thermal properties of the resistor, while the reaction speed is defined by the opening speed of the mechanical switch. The reaction time of such a resistive braking is therefore limited by the speed of the mechanical switch, which could be, for example 50 ms or more. Furthermore, the mechanical switch with the parallel resistor without an engine control is incapable of regulating the speed of the generator. On the other hand, if the system includes only the engine control (without the mechanical switch with the parallel resistor), the system may react almost instantly to a grid event and can control the speed of the generator by partially or fully switching OFF the engine ignition, but this speed control is for a short time as the engine cannot be switched OFF for a too long time. Thus, by using the exemplary systems and methods, the mechanical switch with the parallel resistor are combined with the engine control to achieve a fast acting resistive braking system with generator speed regulation capability.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
   a generator operatively coupled to an engine for generating electrical power and supplying the electrical power to a grid;
   a resistive braking system operatively coupled between the generator and the grid, wherein the resistive braking system comprises:
      a mechanical switch connected in parallel with a resistor; and
      a controller operatively coupled to the engine, wherein the controller, in response to a grid event, is configured to:
         send a first control signal to partially or fully switch OFF an ignition of the engine to control mechanical power from the engine to the generator;
         send a second control signal to open the mechanical switch before a first predetermined time from an occurrence of the grid event to redirect current from the mechanical switch to the parallel connected resistor;
         send a third control signal to partially or fully switch ON the ignition of the engine after the first predetermined time;
         send a fourth control signal to close the mechanical switch if the grid event is cleared before a second predetermined time from the occurrence of the grid event; and
         send a fifth control signal to switch OFF the ignition of the engine if the grid event is continued after the second predetermined time.

2. The system of claim 1, wherein the resistor is sufficiently sized for absorbing a certain amount of the electrical power and energy from the generator when the mechanical switch is opened.

3. The system of claim 1, wherein the controller is configured to regulate a speed of the generator based on the controlled mechanical power from the engine.

4. The system of claim 1, wherein the controller is configured to detect the grid event based on an input signal.

5. The system of claim 4, wherein the input signal comprises a voltage signal, a current signal, a generator power signal, a speed signal, a rotor angle signal, an engine power signal, an engine torque signal, or any combination thereof.

6. The system of claim 1, wherein the engine comprises a gas turbine, a gas engine, or a wind turbine.

7. A method of supplying electrical power to a grid from a generator coupled to a resistive braking system connected between the generator and the grid, the resistive braking system comprising a mechanical switch connected in parallel with a resistor, the method comprising:
   supplying the electrical power to the grid through the mechanical switch under normal operating conditions; and
   upon a grid event being detected, (a) sending a first control signal from a controller for partially or fully switching OFF an ignition of the engine for controlling mechanical power from an engine to the generator, (b) sending a second control signal from the controller for opening the mechanical switch before a first predetermined time from an occurrence of the grid event so that current from the generator is redirected from the mechanical switch to the resistor, (c) sending a third control signal from the controller for partially or fully switching ON the ignition of the engine after the first predetermined time, (d) sending a fourth control signal from the controller for closing the mechanical switch if the grid event is cleared before a second predetermined time from the occurrence of the grid event, and (e) sending a fifth control signal from the controller for switching OFF the ignition of the engine if the grid event is continued after the second predetermined time.

8. The method of claim 7, wherein the grid event is detected based on an input signal.

9. The method of claim 8, wherein the input signal comprises a voltage signal, a current signal, a generator power signal, a speed signal, a rotor angle signal, an engine power signal, an engine torque signal, or any combination thereof.

\* \* \* \* \*